United States Patent [19]

Suzuki et al.

[11] Patent Number: 5,064,717
[45] Date of Patent: Nov. 12, 1991

[54] ADHESIVE SHEET

[75] Inventors: Hideaki Suzuki, Nara; Kenji Hosoyama; Shuichiro Takeda, both of Kobe; Rinzo Kamikura, Sakai, all of Japan

[73] Assignee: Kanzaki Paper Manufacturing Co., Ltd., Tokyo, Japan

[21] Appl. No.: 514,430

[22] Filed: Apr. 25, 1990

[30] Foreign Application Priority Data

Apr. 28, 1989 [JP] Japan ................. 1-109771
May 22, 1989 [JP] Japan ................. 1-129576

[51] Int. Cl.$^5$ ............................... B32B 7/12
[52] U.S. Cl. ..................... 428/352; 428/354; 427/208
[58] Field of Search ............... 428/352, 354; 427/207.1, 208

[56] References Cited

U.S. PATENT DOCUMENTS 4,495,243  1/1985  Kishi ................... 428/352
4,609,589  9/1986  Hosoda et al.
4,720,479  1/1988  Craig et al. ............ 428/352 X

FOREIGN PATENT DOCUMENTS

156598/1989  6/1989  Japan .

*Primary Examiner*—George F. Lesmes
*Assistant Examiner*—D. R. Zirker
*Attorney, Agent, or Firm*—Larson and Taylor

[57] ABSTRACT

Disclosed are an adhesive sheet comprising a release sheet base material, an undercoat layer formed on the release sheet base material, a release agent layer formed on the undercoat layer, an adhesive layer formed on the release agent layer and a surface sheet formed on the adhesive layer, the adhesive sheet being characterized in that the undercoat layer comprises a water-dispersible acrylate or methacrylate copolymer resin having an emulsifier content of about 2 to about 10 wt. % based on the total amount of the monomers used for preparing the copolymer and which resin has a glass transition temperature of about −60° to about 20° C., and that the release sheet base material having the undercoat layer formed thereon, as a whole, has a bulk density of up to 1.0 g/cm$^3$, and a process for preparing a release sheet comprising a release sheet base material, an undercoat layer and a relase agent layer.

12 Claims, 1 Drawing Sheet

ADHESIVE SHEET

BACKGROUND OF THE INVENTION

The present invention relates to an adhesive sheet and, more particularly, to an adhesive sheet which provides facile formation of printing thereon by means of a xerographic recording system such as a non-impact printer, a Kanji printer (i.e., printer which is excellent in resolving power and which is used for recording characters such as Chinese characters), a copier and the like.

Adhesive sheets are in wide use for commercial, office and home application in the form of labels, seals, stickers, emblems, etc.

The adhesive sheet comprises a pressure-sensitive adhesive layer formed between a surface sheet and a release sheet. The surface sheet can be paper, film, metal foil or the like. The release sheet base material can be high density paper such as glassine paper, or clay-coated paper, polyethylene laminated paper or like similar paper, and a release agent such as silicone compounds or fluorine compounds is coated thereon. The clay-coated paper has a clay-coated layer as an undercoat layer over the surface of paper and the polyethylene laminated paper has a polyethylene film laminated as an undercoat layer over the surface of paper. As the pressure-sensitive adhesives, rubber-type, acrylic type, vinyl ether-type adhesives are used in the form of emulsion-type, solvent-type or non-solvent-type composition.

With the development of the information society, demand for the adhesive sheets has been rapidly increasing, particularly for the adhesive sheets useful for printers employing zerography such as a non-impact printer, a Kanji printer, etc.

Heretofore, glassine paper has been used as a release sheet base material of the adhesive sheets used for the above application. However when high density paper with high degree of beating such as glassine paper is used for a Kanji printer, failure in paper feed or in stacking, misregistration in printing and like problems tend to occur. This type of paper is hypersensitive to heat because of its higher degree of shrinkage during drying compared with other ordinary paper. As a result, the paper further shrinks by the action of heat applied during fixation of toner, and a curl of the sheet occurs, thereby causing the above problems. Further, the stacking of the paper is not satisfactorily done by an automatic folding stacker due to high stiffness of the paper. Furthermore, uneven moisture absorption takes place after the fixation of toner by heating, thereby easily causing cockle, curl and the like. Moreover, the blocking of toner is likely to occur since the paper does not rapidly dissipate heat.

Also another problem is the removal of adhesive labels from the release sheet due to insufficient adhesion during transfer or fixation of toner in the printer (i.e., during passing through the parts of the printer having high curvature).

Various methods to correct the curls of adhesive sheet have been proposed in the field of the adhesive sheet. The proposed methods are, for example, the use of a curl breaker whereby a curl in a certain direction is acutely coiled to the reverse direction, the use of an air conditioner, the damping with steam and the like. Up to now, however, these methods entail complicated process with only insufficient effects, thus failing to provide satisfactory results.

SUMMARY OF THE INVENTION

In view of the present situations, the present inventors conducted extensive research on methods for preventing the foregoing drawbacks, especially curls of adhesive paper attributed to release sheet. As a result, the inventors found that the foregoing problems can be efficiently solved by forming a specific undercoat layer on a base material for a release sheet, and forming a release agent layer thereon. The present invention has been accomplished based on this finding.

According to the present invention, there is provided an adhesive sheet which is free from stacking failure, cockling, curling and blocking of toner all associated with a release sheet, and which prevents labels from peeling off the release sheet within a printer.

The present invention provides an adhesive sheet comprising a release sheet base material, an undercoat layer formed on the release sheet base material, a release agent layer formed on the undercoat layer, an adhesive layer formed on the release agent layer and a surface sheet formed on the adhesive layer, the adhesive sheet being characterized in that said undercoat layer comprises a water-dispersible acrylate or methacrylate copolymer resin which has an emulsifier content of about 2 to about 10 wt. % based on the total amount of the monomers used for preparing the copolymer and which resin has a glass transition temperature of about $-60$ to about 20° C., and that the release sheet base material and the undercoat layer as a whole have a bulk density of up to 1.0 g/cm$^3$.

DETAILED DESCRIPTION OF THE INVENTION

The structure of the adhesive sheet according to the present invention will be described below in further detail.

Figure 1:
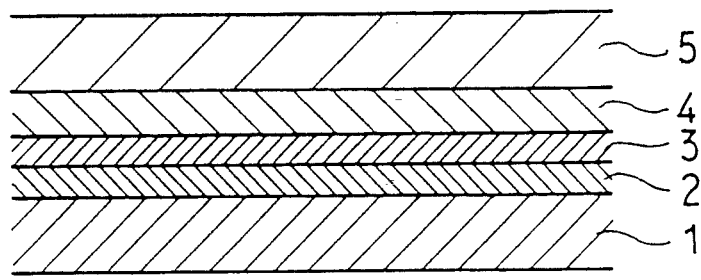
FIG. 1 is a sectional view of the adhesive sheet illustrating one of the embodiments of the invention.

As illustrated in FIG. 1, the adhesive sheet of the invention basically comprises a release sheet base material 1, an undercoat layer 2 formed on the release sheet base material 1, a release agent layer 3 formed on the undercoat layer 2, an adhesive layer 4 formed on the release agent layer 3 and a surface sheet 5 formed on the adhesive layer 4.

The release sheet base material 1 the undercoat layer 2 and the release agent layer 3 together form a release sheet. The surface sheet 5, together with the adhesive layer 4, forms adhesive labels, adhesive seals, adhesive stickers, adhesive emblems, etc.

The present invention is primarily characterized by the undercoat layer 2 and the release sheet base material 1 whereby the aforementioned prior art problems are solved.

The undercoat layer of the invention is formed by applying to the release sheet base material an aqueous emulsion comprising an acrylate or methacrylate copolymer having an emulsifier content of about 2 to about 10% by weight based on the total amount of the monomers used for preparing the copolymer, and the copolymer has a glass transition temperature of about −60 to about 20° C. While various acrylate or methacrylate copolymers are useful as such, the ones prepared by the method disclosed in Japanese Unexamined Patent Publication No. 156598/1989 is suitably used. The acrylate or methacrylate copolymer of Japanese Unexamined Patent Publication No. 156598/1989 can be obtained by copolymerizing acrylic or methacrylic acid alkyl ester, hydrophilic ethylenically unsaturated monomer and if desired other copolymerizable monomer in the presence of an emulsifier.

The alkyl ester of acrylic or methacrylic acid constituting the acrylate or methacrylate copolymer resin useful in the invention are, for example, methyl acrylate or methacrylate, ethyl acrylate or methacrylate, propyl acrylate or methacrylate, butyl acrylate or methacrylate, hexyl acrylate or methacrylate, octyl acrylate or methacrylate, 2-ethylhexyl acrylate or methacrylate, lauryl acrylate or methacrylate, octadecyl acrylate or methacrylate and like $C_1$–$C_{18}$ alkyl ester of acrylic or methacrylic acid.

In preparing the copolymer resin, it is preferable to use the above alkyl ester of acrylic or methacrylic acid in an amount of about 20 to about 99% by weight of the total amount of the monomers used.

According to the invention, of the above acrylates or methacrylates, $C_4$–$C_{18}$ alkyl esters are preferably used in an amount of about 40 to about 90 wt. %. Examples of especially preferable monomers are butyl acrylate or methacrylate, hexyl acrylate or methacrylate, octyl acrylate or methacrylate, 2-ethylhexyl acrylate or methacrylate and like $C_4$–$C_{10}$ alkyl acrylate or methacrylate monomers.

Examples of useful hydrophilic ethylenically unsaturated monomers for forming the above specific copolymer resin are acrylic acid, methacrylic acid, crotonic acid, maleic acid, itaconic acid, fumaric acid, monoalkyl (especially $C_1$–$C_4$ alkyl) maleate, monoalkyl (especially $C_1$–$C_4$ alkyl) itaconate, monoalkyl (especially $C_1$–$C_4$ alkyl) fumarate and like ethylenically unsaturated carboxyl-containing monomers; sodium vinylsulfonate, sodium p-styrenesulfonate, 2-acrylamido-2-methylpropane sulfonic acid, sodium 3-allyloxy-2-hydroxypropane sulfonate, sodium polyoxyethylene styrenated phenyl sulfate, sodium salt of glycerin monoallyl ether monosulfosuccinate, sodium salt of 2-sulfoethyl methacrylate, sodium salt of maleic acid ester of higher alcohol (especially $C_6$–$C_{30}$ alcohol), sodium acrylamidostearate, polyethylene glycol monoallyl ether, methoxypolyethylene glycol acrylate or methacrylate, phenoxypolyethylene glycol acrylate or methacrylate, methoxyethyl acrylate or methacrylate, butoxyethyl acrylate or methacrylate, 2-hydroxyethyl acrylate or methacrylate, 2-hydroxypropyl acrylate or methacrylate, acrylamide, vinyl pyrrolidone, etc.

With less than about 1% by weight of such hydrophilic monomer in the copolymer resin, hydrophilic properties of the copolymer resin will be slightly impaired. The presence of the hydrophilic monomer exceeding about 50% by weight may deteriorate the effect of preventing the occurrence of curls because of an increased hardness of the film, and cause insufficient drying property. For these reasons, the copolymer preferably contains as a monomer component the hydrophilic monomer in an amount of about 1 to about 50% by weight, more preferably about 1 to about 40% by weight.

Among these hydrophilic monomers, especially preferable are ethylenically unsaturated carboxyl-containing monomers such as acrylic acid, methacrylic acid, crotonic acid, maleic acid, itaconic acid, fumaric acid, monoalkyl, particularly mono($C_1$–$C_4$)alkyl maleate, monoalkyl, particularly mono($C_1$–$C_4$)alkyl itaconate, monoalkyl, particularly mono($C_1$–$C_4$)alkyl fumarate, etc. More preferably, the ethylenically unsaturated carboxyl-containing monomers are used in an amount of about 1 to about 20 wt. % based on the total amount of the monomers used.

Said other monomers copolymerizable with the above monomers and for forming the copolymer resin useful in the invention include, for example, vinyl acetate, vinyl chloride, vinylidene chloride, methacrylonitrile, acrylonitrile, styrene, ethylene, ethylene glycol diacrylate or dimethacrylate, diethylene glycol diacrylate or dimethacrylate, triethylene glycol diacrylate or dimethacrylate, (poly)ethylene glycol diacrylate or dimethacrylate, dipropylene glycol diacrylate or dimethacrylate, 1,3-butylene glycol diacrylate or dimethacrylate, trimethylolpropane triacrylate or trimethacrylate, tetramethylolmethane tetraacrylate or tetramethacrylate, divinylbenzene, 1,4-butanediol diacrylate or dimethacrylate, 1,6-hexanediol diacrylate or dimethacrylate, glycidyl acrylate or methacrylate, methylglycidyl acrylate or methacrylate, N-methylol acrylamide or methacrylamide, N-methoxymethyl acrylamide or methacrylamide, N-buthoxymethyl acrylamide or methacrylamide, N,N'-methylene-bis-acrylamide or methacrylamide and the like.

The content of these copolymerizable monomers in the copolymer resin preferably ranges from 0 to about 40% by weight based on the total amount of the monomers used.

Especially, the most desirable acrylate or methacrylate resin in accordance with the invention is one prepared by emulsion copolymerization of a monomer mixture comprising (a) about 1 to about 20 wt. %, preferably about 1 to about 10 wt. %, of said ethylenically unsaturated carboxyl-containing monomer, (b) about 40 to about 90 wt. %, preferably about 50 to about 80 wt. %, of said $C_4$–$C_{18}$ alkyl ester of acrylic or methacrylic acid, and (c) 0 to about 40 wt. %, preferably about 10 to about 30 wt. %, of said other monomer copolymerizable with these monomers (a) and (b).

The above most desirable resin will be hereinafter referred to as "copolymer (I)".

The copolymer resin of the invention is prepared by emulsion copolymerization or graft copolymerization of the monomers shown above in an aqueous medium in the presence of an emulsifier (protective colloid), a polymerization initiator, and if required a chain transfer agent, etc. The amount of an emulsifier is especially important and is in the range of about 2 to about 10% by weight, preferably about 2 to about 6 wt. %, based on the total amount of the monomers constituting the copolymer resin.

Any of emulsifiers conventionally used for emulsion polymerization can be used as said emulsifier in the invention. Such emulsifiers include, for example, sodium dodecylbenzene sulfonate, alkyl polyether sulfate (e.g. sodium salt of polyoxyethylene lauryl ether sulfate) and like anionic emulsifiers; polyoxyethylene nonylphenyl ether, polyoxyethylene-polyoxypropylene block copolymer and like nonionic emulsifers; lauryl pyridinium chloride, cetyl trimethyl ammonium bromide and like cationic emulsifiers; salts of polyoxyethylene alkyl ether sulfate (e.g. those wherein the polymerization degree of ethylene oxide is 20 to 200 and the alkyl has 5-25 carbon atoms), salts of polyoxyethylene alkylphenyl ether sulfate (e.g. those wherein the polymerization degree of ethylene oxide is 20 to 200 and the alkyl has 5-25 carbon atoms) and like surfactants having both nonionic and anionic characters; polyvinyl alcohol, polyvinyl alcohol derivative having at least one functional group selected from the group consisting of acryloyl or methacryloyl group, haloalkylacryloyl or methacryloyl group and N-methylolacrylamido group; polyacrylamide, polyethylene glycol derivatives, casein and like protective colloids.

Examples of chain transfer agents are thioglycol, ethylene thioglycol, thioglycolic acid, n-dodecyl mercaptan and the like. Examples of polymerization initiators are hydrogen peroxide, potassium persulfate, ammonium persulfate, or redox polymerization initiators made from a combination of the above polymerization initiators and a reducing agent such as sodium sulfite, sodium acid sulfite, etc.

The aforementioned emulsifiers are used in an amount of about 2 to about 10 wt. % based on the total amount of the monomers used, and the polymerization initiators are used in an amount of about 0.05 to about 1 wt. % based on the total amount of the monomers used. The polymerization reaction is usually carried out at a temperature ranging from about 60 to about 80° C. for about 4 to about 10 hours in water, preferably in deionized water, and preferably in a nitrogen atmosphere. The polymerization reaction is continued until the molecular weight of the resulting acrylate or methacrylate copolymer becomes about 100,000 to about 1,000,000. When the resulting copolymer contains free carboxyl groups, it is desired to nuetralize the copolymer with a base such as hydroxides of alkali metals or alkaline earth metals, ammonia, amine or the like.

Among the thus obtained copolymer resin emulsions, the present inventors selectively use the ones wherein the emulsifier content thereof is about 2 to about 10 wt. % based on the total amount of the monomers used and wherein the copolymer resin constituting such emulsion has a glass transition temperature of about $-60$ to about 20° C.

The selected emulsions are used in an adjusted solids concentration of about 20 to about 60 wt. %.

According to the invention, the glass transition temperature [Tg] of the copolymer is determined by the formula (1) below.

$$\frac{1}{Tg} = \sum_{i=1}^{n} \frac{W_i}{Tg_i} \quad (1)$$

Tg: Glass transition temperature of the copolymer
$Tg_i$: Glass transition temperature of the homopolymer of monomer i
$W_i$: Weight fraction of monomer i
n: The total number of the kinds of monomers constituting the copolymer With less than 2 wt. % of an emulsifier based on the total amount of the monomers used in the thus obtained copolymer resin emulsion, the emulsion tends to have insufficient stability, resulting in enlarged polymer particle size. The use of the emulsifier exceeding 10 wt. % sometimes deteriorates the adhesive properties between an undercoat layer and a release agent layer. Further, a glass transition temperature lower than $-60°$ C. of the copolymer resin gives a film of excessive adherence. On the other hand, Tg higher than 20° C. renders the resulting film too stiff, and is not suitable for practical use.

In the preparation of the undercoat layer in accordance with one of the preferred embodiments of the invention, the resin of the aforementioned most desirable copolymer (I) is used in combination with copolymer (II) to be identified below. The most desirable copolymer (I) is preferably a copolymer which is prepared by emulsion polymerization of the monomer mixture having the composition given below in the presence of an emulsifier having a molecular weight of about 1,000 to about 10,000 wherein the emulsifier is used in an amount of 2 to 10 wt. % based on the total amount of the monomers used, and which copolymer has a glass transition temperature of $-60$ to 0° C.

(a) about 1 to about 20 wt. %, preferably about 1 to about 10 wt. %, of an ethylenically unsaturated carboxyl-containing monomer, (b) about 40 to about 90 wt. %, preferably about 50 to about 80 wt. %, of $C_4$-$C_{18}$ alkyl ester of acrylic or methacrylic acid, and (c) 0 to about 40 wt. %, preferably about 10 to about 30 wt. %, of other monomer copolymerizable with these monomers.

Copolymer (II) is a copolymer which is prepared by emulsion polymerization of the monomer mixture having the composition given below in the presence of an emulsifier having a molecular weight of about 1,000 to about 10,000 wherein the emulsifier is used in an amount of about 2 to about 10 wt. % based on the total amount of the monomers used, and which copolymer has a glass transition temperature of 45 to 100° C.

(d) about 1 to about 20 wt. %, preferably about 1 to about 10 wt. %, of an ethylenically unsaturated carboxyl-containing monomer, (e) about 5 to about 40 wt. %, preferably about 10 to about 30 wt. %, of $C_4$-$C_{18}$ alkyl ester of acrylic or methacrylic acid, and (f) about 50 to about 90 wt. %, preferably about 60 to about 85 wt. %, of other monomer copolymerizable with these monomers.

The use of copolymer (I) in combination with copolymer (II) gives additional effect of preventing blocking.

Examples of the ethylenically unsaturated carboxyl-containing monomers which constitutes copolymer (I) or (II) for use in this embodiment are acrylic acid, methacrylic acid, crotonic acid, maleic acid, itaconic acid, fumaric acid, monoalkyl, particularly mono($C_1$-$C_4$) alkyl maleate, monoalkyl, particularly mono($C_1$-$C_4$)alkyl itaconate, monoalkyl, particularly mono($C_1$-$C_4$)alkyl fumarate and the like.

With less than 1 wt. % of an ethylenically unsaturated carboxyl-containing monomer based on the total amount of the monomers used, the resulting copolymer tends to have insufficient dispersion stability. Conversely, more than 20 wt. % of the monomer present in the copolymer sometimes gives the copolymer having poor drying properties or reduced effect of preventing the occurrence of curls. For these reasons, the ethylenically unsaturated carboxyl-containing monomer is preferably used in both of copolymers (I) and (II) in the range of 1 to 20 wt. %.

Examples of $C_{4-18}$ alkyl acrylate or methacrylate for forming the preferred water-dispersible copolymer (I) or (II) useful in the invention are butyl acrylate or methacrylate, hexyl acrylate or methacrylate, octyl acrylate or methacrylate, 2-ethylhexyl acrylate or methacrylate, lauryl acrylate or methacrylate, octadecyl acrylate or methacrylate and the like.

The proportion of $C_{4-18}$ alkyl acrylate or methacrylate is in the range of about 40 to about 90 wt. % based on the total amount of the monomers used in copolymer (I) and in the range of about 5 to about 40 wt. % based on the total amount of the monomers used in copolymer (II).

Among the $C_{4-18}$ alkyl acrylate or methacrylate, preferable are butyl acrylate and 2-ethylhexyl acrylate in view of copolymerizability, glass transition temperature and the like.

Examples of said other monomers copolymerizable with the above monomers and used for forming the preferred water-dispersible copolymer (I) or (II) useful in the invention are methyl acrylate or methacrylate, ethyl acrylate or methacrylate, propyl acrylate or methacrylate, vinyl acetate, vinyl chloride, vinylidene chloride, acrylonitrile, methacrylonitrile, styrene, ethylene, ethylene glycol diacrylate or dimethacrylate, diethylene glycol diacrylate or dimethacrylate, triethylene glycol diacrylate or dimethacrylate, (poly)ethylene glycol diacrylate or dimethacrylate, propylene glycol diacrylate or dimethacrylate, dipropylene glycol diacrylate or dimethacrylate, tripropylene glycol diacrylate or dimethacrylate, (poly)propylene glycol diacrylate or dimethacrylate, 1,3-butylene glycol diacrylate or dimethacrylate, trimethylolpropane triacrylate or trimethacrylate, tetramethylolmethane tetraacrylate or tetramethacrylate, divinylbenzene, 1,4-butanediol diacrylate or dimethacrylate, 1,6-hexanediol diacrylate or dimethacrylate, glycidyl acrylate or methacrylate, methylglycidyl acrylate or methacrylate, acrylamide, methacrylamide, N-methylol acrylamide or methacrylamide, N-methoxymethyl acrylamide or methacrylamide, N-butoxymethyl acrylamide or methacrylamide, N,N'-methylene bisacrylamide or bismethacrylamide, etc.

The amount of these other copolymerizable monomers ranges from 0 to 40 wt. % based on the total amount of the monomers used in copolymer (I) and from 50 to 90 wt. % based on the total amount of the monomers used in copolymer (II).

According to the invention, desirably used among these copolymerizable monomers are methyl acrylate or methacrylate, acrylonitrile, methacrylonitrile, acrylamide, methacrylamide and the like in view of glass transition temperature, solvent resistance, heat resistance, etc.

Copolymers (I) and (II) of the invention are prepared by emulsion copolymerization of each monomer exemplified above in the presence of an emulsifier, a polymerization initiator, and if required a chain transfer agent and the like. The kind and the amount of an emulsifier are especially important. Stated more specifically, the emulsifier having a molecular weight of 1,000 to 10,000 are selectively used in this preferred embodiment of the invention. With the molecular weight smaller than 1,000, agglomerates tend to be formed when copolymers (I) and (II) each in the form of aqueous emulsion are admixed together, whereas with the molecular weight exceeding 10,000, the emulsifier has lower emulsifying ability and is not suitable for practical use. Among such emulsifiers, the surfactants having both nonionic and anionic characters within a molecule are particularly preferable. Typical examples of such surfactants are salts of polyoxyethylene alkyl ether sulfate and salts of polyoxyethylene alkyl phenyl ether sulfate, and in each case the polymerization degree of ethylene oxide is 20 to 200 and the alkyl has 5 to 25 carbon atoms, and alkali metal salts are preferred. The amount of the emulsifier is about 2 to about 10 wt. %, preferably about 2 to about 6 wt. % based on the total amount of the monomers used for forming the copolymer. If the amount of the emulsifier is less than 2 wt. %, insufficient stability of the resulting emulsion will result, entailing a tendency toward enlarged polymer particle size. On the other hand, the amount exceeding 10 wt. % may lower adhesive properties between a undercoat layer and a release agent layer.

Examples of chain transfer agents are thioglycerol, ethylene thioglycol, thioglycolic acid, n-dodecyl mercaptan and the like. Examples of polymerization initiators are hydrogen peroxide, potassium persulfate, ammonium persulfate, or redox polymerization initiators made from a combination of the above polymerization initiators and a reducing agent such as sodium sulfite, sodium acid sulfite, etc. The polymerization initiators are used in an amount of about 0.05 to about 1 wt. % based on the total amount of the monomers used. The polymerization reaction is usually carried out at the temperature ranging from about 60 to about 80° C. for about 4 to about 8 hours in water, preferably in deionized water, and preferably in an nitrogen atmosphere. The polymerization reaction is continued until the molecular weight each of the resulting acrylate or methacrylate copolymers (I) and (II) becomes about 100,000 to about 1,000,000.

The thus obtained specific emulsion of water-dispersible copolymer is stabilized by neutralizing carboxyl groups in the copolymer with, for example, sodium hydroxide, potassium hydroxide, ammonia, various primary, secondary, tertiary amines and like suitable alkaline materials and adjusted to a solids concentration of 20 to 60 wt. %, preferably 30 to 50 wt. %.

According to the present embodiment, copolymer (I) having a glass transition temperature of −60 to 0° C. and copolymer (II) having a glass transition temperature of 45 to 100° C. are mixed together each in the form of an emulsion for use. Copolymer (II) is used in an amount of 5 to 80 parts by weight (calculated as solids) per 100 parts by weight (calculated as solids) of copolymer (I). With less than 5 parts by weight of copolymer (II), the resulting coating (i.e., undercoat layer) may have excessive adhesion (Tg of the coating becomes too low) to cause blocking although good prevention of curls is achieved. Conversely, with more than 80 parts by weight of copolymer (II), the hardness of the resulting coating excessively increases (Tg of the coating becomes too high), entailing the problem of involving curls on the undercoat layer surface.

The method for forming the above undercoat layer of the invention on the release sheet base material will be described below.

Usable as a release sheet base material in the invention are various fiber sheets such as wood-free paper, weighing about 30 to about 300 g/m² and having a thickness of about 30 to about 300 μm. In the invention, it is preferable that such release sheet base materials and the undercoat layer formed thereon, as a whole, have a bulk density (according to JIS P8118-1976) of about up to 1.0 g/cm³, more preferably about 1.0 to about 0.6 g/cm³. When a base material having a bulk density of higher than 1.0 g/cm³ such as glassine paper is used, uneven moisture absorption will take place after the fixation of toner by heating in a non-impact printer or a Kanji printer to cause cockle, curl or the like. Further, the use of such material is prone to cause blocking of toner since it does not rapidly dissipate heat.

The stiffness of the release sheet base material is closely related with the folding operation of the adhesive sheet to be conducted by an automatic folding stacker. In the invention, it is desirable that the release sheet base material and the undercoat layer formed thereon, as a whole, have a stiffness of 70 to 200 mg (as determined by Gurley stiffness tester according to TAPPI STANDARDS, T543 pm-84; see Paper Trade Journal, 104, p.287–290 (1937)) for assured stacker suitability. Such embodiment is one of the preferred embodiments of the invention. With a stiffness lower than 70 mg, adhesive sheets are folded at other parts than the transverse perforations. With a stiffness greater than 200 mg, adhesive sheets are not always folded even at the transverse perforations. Thus, the stiffness outside the above range may deteriorate suitability for stacking.

According to the present invention, an undercoat layer is formed by applying a coating composition for forming an undercoat layer on the release sheet base material and drying the coated base material. The coating composition for forming the undercoat layer comprises an aqueous emulsion of acrylate or methacrylate copolymer resin having an emulsifier content of about 2 to about 10 wt. % based on the total amount of the monomers used wherein the copolymer resin has a glass transition temperature of about −60 to about 20° C. Alternatively, the coating composition for forming the undercoat layer comprises a mixture of copolymer (I) and copolymer (II) described in the above preferred embodiment.

The coating composition for forming the undercoat layer is suitably applied, for example, by means of a blade coater, air knife coater, roll coater, gravure coater, bar coater, size press coater or like various coaters. Especially, a blade coater among others is favorably used for applying the copolymer emulsion of the above preferred embodiment of the invention, because the copolymer emulsion prepared by emulsion polymerization using an emulsifier having a comparatively high molecular weight can have a high solids concentration. To obtain a suitable coating composition for a blade coating, it is desired to use a thickener. While sodium alginate, carboxymethyl cellulose, methyl cellulose, etc. are known as thickeners useful for coating compositions, they give coating compositions unsatisfactory in dispersion stability, in resistance to putrefaction and the like. Therefore, it is desirable to use polyoxyethylene ether derivative-type thickeners. In addition, the polyoxyethylene ether derivative-type thickeners are more effective in improving water retention of the coating composition than the usual thickeners, and efficiently give a coating composition suitable for a high consistency blade coating. Such polyoxyethylene ether derivative-type thickeners are available, for example, under trade name of "Vissurf S" or "Vissurf 1400" (each product of Kao Atlas Co., Ltd.).

The thickener is used in an amount of 0.01 to 5 parts by weight based on 100 parts by weight of the total amount of the acrylate or methacrylate copolymer(s). With less than 0.01 part by weight of the thickener used, the desired effects will not be produced, whereas the use of the thickener in an amount exceeding 5 parts by weight renders the coating composition too viscous, and is unsuitable for blade coating. The suitable viscosity of the coating composition for blade coating is about 300 to about 2,000 cps.

The method for a blade coating is not limited to ones using a Bevel type blade or a bent type blade, but also includes ones using a rod blade or the like. Unlike the undercoat layer prepared by a bar coating or air knife coating, the one obtained by applying the above specific coating composition on a release sheet base material by means of a blade coating has an extremely good surface smoothness so that excessive calendering is not required with the result that the resulting undercoat layer has high void volume fraction, greatly contributing to the production of release sheet free from the occurrence of curls. Additionally, the coated layer dries rapidly to save the cost of facilities or energy required for drying.

Needless to say, other coating methods than the above blade coating methods, such as a coating method by a bar coater can also be performed. Supercalendering may also be done when so required to enhance the smoothness of the coated layer.

The coating composition of the invention for forming the undercoat layer may optionally contain additives so far as the desired effects of the invention is not inhibited. Examples of additives include water-soluble plasticizer such as ethylene glycol, glycerin, trimethylolpropane, diethylene glycol and like polyvalent alcohols and polyethylene glycol, polypropylene glycol and like polyalkylene glycols; urea-formaldehyde resin, melamine-formaldehyde resin, polyamide-polyamineepichlorohydrin resin, epoxy resin and like crosslinking agent; polyvinyl alcohol, styrene-maleic anhydride copolymer salt, ethylene-acrylic acid copolymer salt and like binder resins; lubricant; filler; defoaming agent; wetting agent; leveling agent; curing agent; film coalescing aid and the like. These additives, when used, can be used in an amount of about 0 to about 20 parts by weight, preferably about 1 to about 10 parts by weight, based on 100 parts by weight of the total amount of the acrylate or methacrylate copolymer(s) used.

The coating composition for forming the undercoat layer may be applied to the release sheet base material not only by off-machine coater but also by on machine coater, wherein the coater is mounted on a paper making machine. Especially when the base material is wood-free paper, the coating operation is preferably conducted by an on-machine blade coater because sufficient amount of coating composition can be easily applied due to the temperature of the base material immediately prior to the coating operation and the like.

According to the present invention, the coating composition for forming the undercoat layer is desirably applied in the range of about 0.1 to about 20 g/m$^2$, more preferably about 1 to about 10 g/m$^2$, on dry basis. The composition applied is dried at about 110 to about 150° C. for about 0.5 to about 2 minutes.

The release agent applicable to the undercoat layer is not limited. Any of the release agents conventionally used in this field such as various silicone compounds, fluorine-containing compounds and the like can be applied in the usual method. The adhesion between the adhesive label and the release sheet is closely related with labelling suitability of the adhesive sheet in a non-impact printer or a Kanji printer. Stated more specifically, the adhesive label (comprising a surface sheet and an adhesive layer) must pass through the printer without being peeled from the release sheet (comprising a release sheet base material, undercoat layer and release agent layer), and on the other hand, must be excellent in releasability from the release sheet after label is printed for adherence to an appropriate object. In order to assure such excellent releasability, it is desirable that the release agent have a tensile strength (according to JIS K-6301) of at least about 30 Kg/cm$^2$, preferably about 40 to about 100 kg/cm$^2$. With less than 30 Kg/cm$^2$ of a tensile strength, the adhesive label may peel off in the printer, entailing a tendency toward the failure in feeding. Useful release agents in the invention as having such tensile strength are known and commercially available, such as silicone release agents obtainable under the trade names of BY24-162, SD-7320 (both brand names for products of Dow Corning Toray Silicone Co., Ltd.), X-62-2402 (brand name for product of Shin-etsu Chemical Co., Ltd.), etc. These release agents are generally applied in the form of a solution in organic solvents such as toluene, hexane and the like. While the concentration of the solution is not particularly limited, preferable concentration ranges from about 3 to about 15 wt. %. The release agent solution is applied, without specific limitation, by means of a bar coater, a gravure coater, a roll coater or like other equipment in an amount of usually about 0.1 to about 5.0 g/m$^2$, preferably about 0.3 to about 1.5 g/m$^2$, on dry basis. The coated layer of the release agent solution is dried at about 120 to about 160° C. for about 1 to about 2 minutes.

Thus, the release sheet used in the invention comprising a release sheet base material, an undercoat layer and a release agent layer is prepared.

Accordingly, the present invention also provides a method for preparing a release sheet comprising the steps of forming an undercoat layer by applying to one or both sides of a release sheet base material a coating composition comprising an acrylate or methacrylate copolymer resin which has an emulsifier content of 2 to 10 wt. % based on the total amount of the monomers used for preparing the copolymer resin and which has a glass transition temperature of −60 to 20° C., and forming a release agent layer on said undercoat layer.

On the thus prepared release sheet, the adhesive layer is formed in the conventional manner. The adhesive is selected from the broad range of the pressure-sensitive adhesives conventionally used in the art, such as solvent type adhesive, emulsion type adhesive, hot-melt type adhesive and the like. Especially desirable are acrylic solvent type adhesive, acrylic emulsion type adhesive, acrylic hot-melt type adhesive and rubber solvent type adhesive, rubber hot-melt adhesive. These adhesive are first made into a coating composition by being solved or dispersed in a medium such as an organic solvent (e.g. toluene, ethyl acetate) or water so that the coating composition has a viscosity of about 3,000 to 8,000 cps. Then, the coating composition is applied on the release sheet by means of a roll coater, a knife coater, a bar coater, a slot die coater or like conventional coating devices. The amount of the coating composition to be applied is usually about 10 to 50 g/m$^2$, preferably about 15 to about 30 g/m$^2$, on dry basis, although widely variable depending on the particular application of finished products, kind of surface sheet, degree of adhesion, etc. After applying, the coating composition is dried at about 100 to about 130° C. for about 0.5 to about 2 minutes.

On the thus obtained adhesive layer is superposed a surface sheet. Various surface sheet are usable depending on the application of finished adhesive sheet, but generally surface sheets weighing about 30 to 300 g/m$^2$ are preferably employed. Especially preferable as the surface sheet are paper, synthetic paper, film and the like.

When a toner fixing ability is desired to be improved for use in a non-impact printer or a Kanji printer, a polymer having a glass transition temperature of −40 to +100° C., preferably −10 to +100° C., is desirably applied to or impregnated into the front face of the surface sheet (i.e. the face free of contact with the adhesive layer). Examples of useful polymers are ethylene resin, propylene resin, styrene resin, vinyl chloride resin, vinylidene chloride resin, ethylene-vinyl acetate copolymer resin, ethylene-vinyl chloride copolymer resin, vinyl chloride-vinyl acetate copolymer resin, ethylene-acrylic acid salt copolymer resin, ethylene-methacrylic acid salt copolymer resin, amide resin, nitrile resin, urethane resin, polymer or copolymer resin of acrylic acid ester, polymer or copolymer resin of methacrylic acid ester and like water-dispersible or water-soluble polymers.

Especially useful by virtue of its excellent effects are ethylene-vinyl acetate copolymer resin, ethylene-vinyl chloride copolymer resin, vinyl chloride-vinyl acetate copolymer resin, polymer or copolymer resin of acrylic acid ester and polymer or copolymer of methacrylic acid ester.

If the polymer has a glass transition temperature of lower than −10° C., and particularly lower than −40° C., the polymer coating exhibits excessive adhesiveness to cause blocking. If the polymer has a glass transition temperature of higher than 100° C., the resulting coating will have increased hardness to cause the problems of curls on the coated surface and of reduced toner fixing ability.

The method for preparing the polymer is not limitative, and any of the conventional methods are employed. For example, the polymer is prepared by solution polymerization in water or in a solvent using a chain transfer agent, a polymerization initiator, etc. or by emulsion polymerization in an aqueous medium using a chain transfer agent, a polymerization initiator, an emulsifier (a dispersant) and the like.

The coating composition comprising the above specific polymer is desirably prepared in the form of an aqueous dispersion in view of drying properties, the effects in improving toner fixing ability and correction of curls and safety during application.

The polymer coating composition can optionally contain additives so far as the desired effects attainable by the present invention are not inhibited. Examples of additives to be used are various water-soluble polymers including cellulose derivatives such as methyl cellulose, ethyl cellulose, hydroxyethyl cellulose, carboxy methyl cellulose, and starch derivatives such as dextrine, acid-treated starch, oxidized starch, crosslinked starch, starch ester, graft copolymerized starch, etc.; water-soluble plasticizer including polyvalent alcohols such as ethylene glycol, glycerin, trimethylol propane, diethylene glycol, etc., and polyalkylene glycols such as polyethylene glycol, polypropylene glycol, etc.; defoaming agent; wetting agent; lubricant; leveling agent; curing agent; thickener; film coalescing aid and the like.

The coating composition is prepared by adding the various additives to the above specific polymer as a major ingredient and desirably adjusted to a solids concentration of 1 to 50 wt. %, preferably 2 to 20 wt. %.

The coating composition thus prepared is, without specific limitation, suitably applied to or impregnated into the front face of the surface sheet by means of an air knife coater, a roll coater, a gravure coater, a bar coater, a blade coater, a size press coater or like various coaters.

The amount of the coating composition to be applied or impregnated is preferably in the range of about 0.05 to about 20 g/m$^2$, more preferably about 0.1 to about 8 g/m$^2$, on dry basis. The coated composition is favorably dried at about 100 to about 130° C. for about 0.5 to about 2 minutes.

Figure 2:
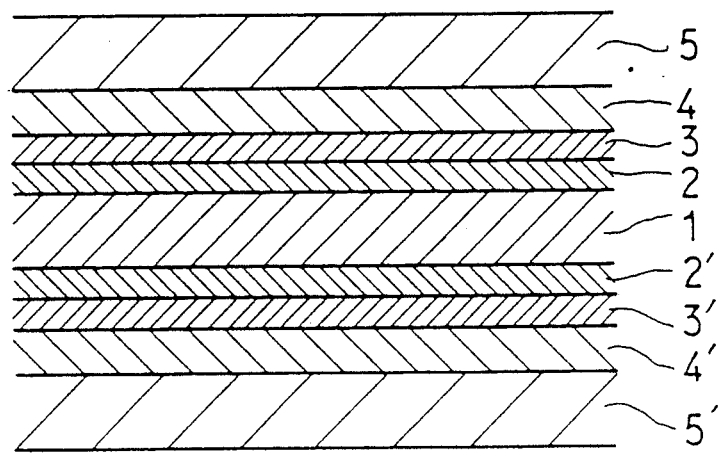
FIG. 2 is a sectional view of the adhesive sheet illustrating another embodiment according to the invention.

In accordance with the invention, as shown in FIG. 2, release sheet base material 1 may have on each side undercoat layers 2, 2', release agent layers 3, 3', adhesive layers 4, 4' and surface sheets 5, 5' in the order mentioned. The layer 2' may be identical with or different from the layer 2. The same applied to the layers 3, 3', layers 4, 4'and layers 5, 5'. Further, the front faces of surface sheets 5,5' (faces free of contact with adhesive layers 4, 4') may be coated or impregnated with the above polymer coating composition if so desired.

The obtained product is, if required, subjected to aftertreatment such as moisture conditioning or the like whereby an adhesive sheet is obtained as a finished product.

The present invention will be described below in further detail with reference to the following Examples, but the invention is not limited to these examples. In the Examples and Comparison Examples, the coating amount of application, number of parts, mixing ratio, etc. are all expressed in solids content or on dry basis. The emulsifier content is expressed in terms of percentage based on the total amount of the monomers used. Furthermore, the bulk density, stiffness and tensile strength of release agent were determined according to the following standards.

Bulk density: JIS P8118-1976
Stiffness: TAPPI STANDARDS, T543 pm-84
Tensile strength of release agent: JIS K-6301

EXAMPLE 1

(1) Preparation of surface sheet

A coating composition of the following composition was applied to the surface of wood-free paper weighing 64 g/m$^2$ and having a thickness of 75 μm by means of an air knife coater in an amount of 1.0 g/m$^2$ on dry basis, and dried at 90° C. for 30 seconds. Then the coated paper was subjected to smoothing by supercalendering, thereby giving a surface sheet.

The coating composition used was an aqueous coating composition having a solids concentration of 8% by weight and having the following composition.

Acrylate copolymer resin 97 wt. parts (Tg=47° C., tradename: "Rikabond ES-20", product of Chuo Rika Kogyo Kabushiki Kaisha):
Wax emulsion: 2 wt. parts
Defoaming agent: 1 wt. part (2) Preparation of release sheet An emulsified monomer mixture (a$_1$) was prepared by vigorously mixing 270 g of butyl acrylate, 15 g of acrylic acid, 113 g of acrylonitrile, 2 g of N-methylolacrylamide, 5 g of polyoxyethylene nonylphenyl ether (emulsifier) and 5 g of oxyethylene-oxypropylene block polymer-type emulsifier in 170 g of deionized water.

Then, into a 2 liter four-necked flask equipped with a stirrer, condenser, dropping funnel, nitrogen gas inlet and thermometer were placed 240 g of deionized water, 2 g of a 1:1 mixture of polyoxyethylene nonylphenyl ether (emulsifier) and oxyethylene-oxypropylene block polymer-type emulsifier and 0.8 g of potassium persulfate. The atmosphere in the flask was replaced with nitrogen gas and the temperature was raised to 70° C. Then, a 1/6 portion of the above emulsified monomer mixture (a$_1$) was added dropwise thereto.

When the conversion reached 90%, the remaining portion of the emulsified monomer mixture (a$_1$) was added dropwise over 2 hours and subjected to polymerization. After completion of the dropwise addition, the reaction mixture was aged at 70° C. for 2 hours so as to complete the reaction. After the aging, the content of the flask was cooled to 40° C., and an aqueous solution of sodium hydroxide was added thereto for neutralization. The neutralized mixture was vigorously agitated to give an aqueous dispersion of the copolymer having an emulsifier content of 3.0 wt. %. The copolymer thus obtained had a glass transition temperature of −29° C.

To 75 parts by weight of the aqueous dispersion of the copolymer were added 24 parts by weight (calculated as solids) of a 25% aqueous solution of oxidized starch (tradename: Ace C, product of Oji Corn Starch Kabushiki Kaisha) and then 1 part of colloidal silica (tradename: Snowtex 30, product of Nissan Kagaku Kogyo Kabushiki Kaisha), giving a coating composition for forming an undercoat layer and having a solids concentration of 30 wt. %.

The coating composition for forming an undercoat layer was applied to the surface of wood-free paper weighing 64 g/m$^2$ and having a thickness of 75 μm by means of a bar coater in an amount of 4 g/m$^2$ on dry basis. The coated paper was dried at 120° C. for 1 minute and then subjected to smoothing by supercalendering, thereby giving an undercoat layer. The release sheet base material having the undercoat layer formed thereon as a whole (as an integral member) had a bulk density of 0.82 g/cm$^3$ and a stiffness of 90 mg.

To the undercoat layer was applied a 9% solution of silicone release agent (tradename: BY24-162, product of Toray Dow Corning Silicone Kabushiki Kaisha) in toluene in an amount of 1.0 g/m$^2$ on dry basis by means of a bar coater. The coated layer was dried at 130° C. for 1 minute, giving a release sheet (tensile strength of the release agent=40 kg/cm$^2$).

(3) Preparation of adhesive sheet

To the thus obtained release agent layer was applied an acrylic emulsion adhesive (tradename: Nikazole TS-662, product of Nippon Carbide Industries Co., Ltd.) by means of a reverse roll coater in an amount of 20 g/m$^2$ on dry basis. The coated layer was.dried at 120° C. for 1 minute.

The surface sheet obtained in (1) above was superposed onto the thus obtained adhesive layer and mounted by means of a nip roll, and the resulting product was subjected to moisture conditioning such that the moisture content of the release sheet became 6%.

The obtained adhesive sheet was excellent in ability to pass through a Kanji printer (tradename: MELCOM 8270, Product of Mitsubishi Electric Co., Ltd) and in suitability for printing.

EXAMPLE 2

(1) Preparation of surface sheet

A coating composition of the following composition was applied to the surface of wood-free paper weighing 64 g/m$^2$ and having a thickness of 75 μm by means of a bar coater in an amount of 1.2 g/m$^2$ on dry basis, and dried at 100° C. for 30 seconds. Then the coated paper was subjected to smoothing by supercalendering, thereby giving a surface sheet.

The coating composition used was an aqueous coating composition having a solids concentration of 10% by weight and having the following composition.

Ethylene-vinyl acetate copolymer resin 90 wt. parts (Tg=0° C., tradename: "Rikabond BE-800, product of Chuo Rika Kogyo Kabushiki Kaisha):
Colloidal Silica: 8 wt. parts
Defoaming agent: 2 wt. parts (2) Preparation of release sheet An emulsified monomer mixture ($a_2$) was prepared by vigorously mixing 190 g of 2-ethylhexyl acrylate, 60 g of methyl methacrylate, 120 g of acrylonitrile, 30 g of acrylic acid, 8 g of polyoxyethylene alkylphenyl ether sulfate sodium salt (molecular weight=1200) and 8 g of dioctyl sulfosuccinate sodium salt in 170 g of deionized water.

Polymerization reaction was effected in the same manner as in Example 1 with the exception of using the obtained emulsified monomer mixture ($a_2$), and the reaction mixture was aged at 70° C. for 2 hours so as to complete the reaction.

After the aging, the content of the flask was cooled to 50° C., and an aqueous solution of potassium hydroxide was added thereto for neutralization. The neutralized mixture was vigorously agitated to give an emulsion of water-dispersible copolymer ($a_2$) to be used in the invention and having an emulsifier content of 4.0 wt. %. The copolymer ($a_2$) thus obtained had a glass transition temperature of −6° C.

An emulsified monomer mixture ($b_2$) was prepared by vigorously mixing 100 g of butyl acrylate, 250 g of methyl methacrylate, 50 g of acrylic acid, 5 g of polyoxyethylene nonylphenyl ether (molecular weight=600) and 5 g of oxyethylene-oxypropylene block polymer (molecular weight=2000) in 170 g of deionized water. The emulsified monomer mixture ($b_2$) was polymerized and the reaction mixture was aged in the same manner as in Example 1.

After the aging, the content of the flask was cooled to 50° C., and an aqueous solution of potassium hydroxide was added thereto for neutralization. The neutralized mixture was vigorously agitated to give an emulsion of water-dispersible copolymer ($b_2$) to be used in the invention and having an emulsifier content of 2.5 wt. %. The copolymer ($b_2$) had a glass transition temperature of 42° C.

To 70 parts by weight (calculated as solids) of the emulsion of water-dispersible copolymer ($a_2$) was added 30 parts by weight (calculated as solids) of the emulsion of water-dispersible copolymer ($b_2$) to give a coating composition for forming an undercoat layer and having a solids concentration of 35 wt. %.

The obtained coating composition for forming an undercoat layer was applied to the surface of wood-free paper weighing 84 g/m$^2$ and having a thickness of 90 μm by means of a blade coater in an amount of 3.5 g/m$^2$ on dry basis. The coated paper was dried at 120° C. for 1 minute and then subjected to supercalendering, thereby giving a release sheet base material with an undercoat layer formed thereon. The base material having the undercoat layer formed thereon as a whole had a bulk density of 0.85 g/cm$^3$ and a stiffness of 120 mg.

To the undercoat layer was applied a 7% solution of silicone release agent (tradename: X-62-2402, product of Shinetsu Kagaku Kogyo Kabushiki Kaisha) in toluene in an amount of 0.9 g/m$^2$ on dry basis by means of a gravure coater. The coated paper was dried at 130° C. for 1 minute, giving a release sheet (tensile strength of the release agent=35 kg/cm$^2$).

(3) Preparation of adhesive sheet

To the thus obtained release agent layer was applied an acrylic emulsion adhesive (tradename: Saibinol AT-560, product of Saiden Kagaku Kabushiki Kaisha) by means of a comma coater (product of Hirano Tecseed Kabushiki Kaisha) in an amount of 18 g/m$^2$ on dry basis. The coated layer was dried at 100° C. for 90 seconds The above surface sheet obtained in (1) above was superposed onto the thus obtained adhesive layer and mounted by means of a nip roll, and the resulting product was subjected to moisture conditioning such that the moisture content of the release sheet became 6%.

The obtained adhesive sheet was excellent in ability to pass through a Kanji printer (tradename: MELCOM 8270, product of Mitsubishi Electric Co., Ltd.) and in suitability for printing.

EXAMPLE 3

(1) Preparation of surface sheet

A coating composition of the following composition was applied to the surface of wood-free paper weighing 52 g/m$^2$ and having a thickness of 90 μm by means of bar coater in an amount of 0.8 g/m$^2$ on dry basis, and dried at 80° C. for 30 seconds. Then the coated paper was subjected to smoothing by supercalendering, thereby giving a surface sheet.

The coating composition used was an aqueous coating composition having a concentration of 12% by weight and having the following composition.

Acrylate copolymer resin 96 wt. parts (Tg=70° C., tradename: "Rikabond SA-Z713, product of Chuo Rika Kogyo Kabushiki Kaisha):
Wax emulsion: 3 wt. parts
Defoaming agent: 1 wt. part (2) Preparation of release sheet An emulsified monomer mixture ($a_3$) was prepared by mixing 300 g of 2-ethylhexyl acrylate, 20 g of acrylic acid, 78 g of methyl methacrylate, 2 g of polyethylene glycol dimethacrylate, 10 g of polyoxyethylene alkylphenyl ether sulfate sodium salt (emulsifier, molecular weight=800) and 10 g of dioctyl sulfosuccinate sodium salt (emulsifier, molecular weight=426) in 170 g of deionized water.

Polymerization was conducted in the same manner as in Example 1 with the exception of using the obtained emulsified monomer mixture ($a_3$), and the reaction mixture was aged at 70° C. for 2 hours so as to complete the reaction. The resulting copolymer ($a_3$) had a glass transition temperature of −28° C. and the copolymer emulsion had an emulsifier content of 5 wt. %.

An emulsified monomer mixture ($b_3$) was prepared by mixing 25 g of butyl acrylate, 60 g of acrylonitrile, 15 g of acrylic acid, 3 g of sodium salt of polyoxyethylene alkylphenyl ether sulfate and 0.2 g of ammonium persulfate in 100 g of deionized water.

While maintaining the temperature within the flask at 70° C., the emulsified monomer mixture ($b_3$) was added dropwise over 1 hour to the emulsion of copolymer ($a_3$) obtained above. The mixture was reacted for 3 hours and cooled to give an emulsion of a graft copolymer. To the graft copolymer emulsion was added an aqueous solution of potassium hydroxide for neutralization. The neutralized mixture was vigorously agitated to give an emulsion of a water-dispersible graft copolymer. The obtained aqueous graft copolymer had an average particle size of 0.1 μm and glass transition temperatures of 46° C. and −28° C. and the emulsion had an emulsifier content of 4.6 wt. %.

To 90 parts by weight of the emulsion of water-dispersible block copolymer were added 8 parts by weight of polyethylene glycol and 2 parts by weight of colloidal silica (tradename: Snowtex 30, product of Nissan Kagaku Kogyo Kabushiki Kaisha), giving an coating composition for forming an undercoat layer and having a solids concentration of 33 wt. %.

The coating composition was applied to the surface of wood-free paper weighing 97 g/m² and having a thickness of 125 μm by means of a bar coater in an amount of 4.0 g/m² on dry basis. The coated paper was dried at 120° C. for 1 minute and then subjected to smoothing by supercalendering, thereby giving a release sheet base material with an undercoat layer formed thereon. The base material having the undercoat layer formed thereon, as an integral member, had a bulk density of 0.85 g/cm³ and a stiffness of 150 mg.

To the undercoat layer was applied a 9% solution of silicone release agent (tradename: SD-7320, product of Toray Dow Corning Silicone Kabushiki Kaisha) in toluene in an amount of 1.0 g/m² on dry basis by means of a bar coater. The coated layer was dried at 140° C. for 1 minute, giving a release sheet (tensile strength of the release agent=45 kg/cm²)

(3) Preparation of adhesive sheet

To the thus obtained release agent layer was applied an acrylic emulsion adhesive (tradename: Olibain BPW-3110, product of Toyo Ink Seizo Kabushiki Kaisha) by means of a slot die coater in an amount of 20 g/m² on dry basis. The coated layer was dried at 120° C. for 1 minute.

The above surface sheet was superposed onto the thus obtained adhesive layer and mounted by means of a nip roll, and the resulting product was subjected to moisture conditioning such that the moisture content of the release sheet became 6%.

The obtained adhesive sheet was excellent in ability to pass through a Kanji printer (tradename: MELCOM 8270, Product of Mitsubishi Electric Co., Ltd.) and in suitability for printing.

EXAMPLE 4

An adhesive sheet was prepared in the same manner as in Example 3 with the exception of using a surface sheet made of wood-free paper having no polymer coating thereon, weighing 52 g/m² and having a thickness of 70 μm.

The obtained adhesive sheet was excellent in ability to pass through a Kanji printer (tradename: MELCOM 8270, product of Mitsubishi Electric Co., Ltd.), and the toner fixing ability thereof was slightly impaired but no practical problem occurred.

EXAMPLE 5

A release sheet comprising an undercoat layer and a release agent layer was prepared in the same manner as in Example 1 with the exception of using wood-free paper weighing 120 g/m² and having a thickness of 160 μm. (The release sheet base material having the undercoat layer formed thereon, as an integral member, had a bulk density of 0.80 g/cm³ and a stiffness of 230 mg).

Using the thus-obtained release sheet and following the procedure of Example 1, an adhesive sheet was prepared.

The obtained adhesive sheet was applied to a Kanji printer (tradename: MELCOM 8270, product of Mitsubishi Electric Co., Ltd.) for printing. The adhesive sheet was excellent in toner fixing ability, but rarely caused jamming.

COMPARISON EXAMPLE 1

(1) Preparation of release sheet

To glassine paper weighing 85 g/m² and having a thickness of 75 μm (bulk density: 1.13 g/cm³, stiffness: 210 mg) was applied a 9% solution of silicone release agent as used in Example 1 (tradename: BY24-162, product of Toray Dow Corning Silicone Kabushiki Kaisha) in toluene in an amount of 1.0 g/m² on dry basis by means of a gravure coater. The coated layer was dried at 130° C. for 1 minute, giving a release sheet.

(2) Preparation of adhesive sheet

To the thus obtained release agent layer was applied an acrylic emulsion adhesive used in Example 1 (tradename: Nikazole TS-662, product of Nippon Carbide Industries, Co., Ltd.) by means of a reverse roll coater in an amount of 20 g/m² on dry basis. The coated layer was dried at 120° C. for 1 minute. A surface sheet prepared in the same manner as in Example 1 was superposed onto the thus obtained adhesive layer and mounted by means of a nip roll. The resulting product was subjected to moisture conditioning such that the moisture content of the release sheet became 6%.

The obtained adhesive sheet was applied to a Kanji printer (tradename: MELCOM 8270, product of Mitsubishi Electric Co., Ltd.) for printing with the result that it involved jamming, blocking after the fixation of toner by heat and cockling due to uneven moisture absorption, and hence the ability thereof to pass through the Kanji printer was not good.

EXAMPLE 6

An adhesive sheet was prepared in the same manner as in Example 1 with the exception of using, as release agent, a silicone release agent (tradename: SRX-211, Toray Dow Corning Silicone Kabushiki Kaisha) which had a tensile strength of 15 kg/cm².

The obtained adhesive sheet was subjected to printing by a Kanji printer (tradename: MELCOM 8270, product of Mitsubishi Electric Co., Ltd.), with the result that labels rarely peeled off in the printer due to inadequate adhesion.

EXAMPLE 7

An emulsified monomer mixture ($a_6$) was prepared by vigorously mixing 270 g of butyl acrylate, 16 g of acrylic acid, 114 g of acrylonitrile and 10 g of sodium salt of polyoxyethylene nonylphenyl ether sulfate (tradename: Latemul E-975, product of Kao Atlas Co., Ltd., molecular weight=3,622) in 170 g of deionized water.

Then, into a 2 liter four-necked flask equipped with a stirrer, condenser, dropping funnel, nitrogen gas inlet and thermometer were placed 240 g of deionized water, 2 g of the same emulsifier as contained in emulsified monomer mixture ($a_6$) and 0.8 g of potassium persulfate. The atmosphere in the flask was replaced with nitrogen gas and the temperature was raised to 70° C. Then, a 1/6 portion of the above emulsified monomer mixture ($a_6$) was added dropwise thereto. When the conversion reached 90%, the remaining portion of the emulsified monomer mixture ($a_6$) was added dropwise over 2 hours and subjected to polymerization. After completion of the dropwise addition, the reaction mixture was aged at 70° C. for 2 hours so as to complete the reaction.

After the aging, the content of the flask was cooled to 40° C., and an aqueous solution of sodium hydroxide was added thereto for neutralization. The neutralized mixture was vigorously agitated to give an emulsion of water-dispersible copolymer [I] having an emulsifier content of 3.0 wt. %. The water-dispersible copolymer [I] had a glass transition temperature of $-21°$ C.

Then, an emulsified monomer mixture ($b_6$) was prepared by vigorously mixing 80 g of butyl acrylate, 8 g of acrylic acid, 240 g of acrylonitrile, 72 g of methyl methacrylate and 10 g of the above emulsifier in 170 g of deionized water. The mixture ($b_6$) was subjected to polymerization reaction and the reaction mixture was aged in the same manner as in the case of water-dispersible copolymer [I].

After the aging, the content of the flask was cooled to 40° C., and an aqueous solution of sodium hydroxide was added thereto for neutralization. On completion of the reaction, the neutralized mixture was vigorously agitated to give an emulsion of water-dispersible copolymer [II] having an emulsifier content of 3.0 wt. %. The obtained aqueous copolymer [II] had a glass transition temperature of 56° C.

To 100 parts by weight (calculated as solids) of the emulsion of water-dispersible copolymer [I] were added 20 parts by weight (calculated as solids) of the emulsion of water-dispersible copolymer [II], and further added 1 part by weight of colloidal silica (tradename: Snowtex 30, product of Nissan Kagaku Kogyo Kabushiki Kaisha) and 1 part by weight of glycerin, giving a coating composition for forming an undercoat layer and having a solids concentration of 35 wt. % and a viscosity of 400 cps.

The coating composition was applied to wood-free paper weighing 40 g/m² and having a thickness of 55 μm by means of a blade coater in an amount of 5 g/m² on dry basis. The coated paper was dried to give a release sheet base paper having an undercoat layer formed thereon, which as a whole had a bulk density of 0.80 g/cm³.

The silicone release agent as used in Example 1 was applied to the surface of the above undercoat layer and dried in the same manner as in Example 1 to give a release sheet of the invention.

The release sheet base paper having the undercoat layer formed thereon had an excellent resistance to the coating composition of the release agent, and the obtained release sheet had uniform and adequate releasability. Then, an adhesive sheet was prepared in the same manner as in Example 1 using this release sheet. The obtained adhesive sheet involved no occurrence of curls and was outstanding in ability to pass through a copier and in suitability for copying by the copier.

EXAMPLE 8

An emulsified monomer mixture ($a_7$) was prepared by mixing 190 g of 2-ethylhexyl acrylate, 60 g of methyl methacrylate, 120 g of acrylonitrile, 30 g of acrylic acid and 16 g of sodium salt of polyoxyethylene lauryl ether sulfate (tradename: Latemul E-150, product of Kao Atlas Co., Ltd., molecular weight: 2,488) in 170 g of deionized water.

Polymerization reaction was conducted in the same manner as in Example 7 with the exception of using the obtained emulsified monomer mixture ($a_7$), and the reaction mixture was aged at 70° C. for 2 hours so as to complete the reaction.

After the aging, the content of the flask was cooled to 40° C., and an aqueous solution of potassium hydroxide was added thereto for neutralization. On completion of the reaction, the neutralized mixture was vigorously agitated to give an emulsion of water-dispersible copolymer [I] having an emulsifier content of 4.5 wt. %. The obtained water-dispersible copolymer [I] had a glass transition temperature of $-6°$ C.

An emulsified monomer mixture ($b_7$) was prepared by vigorously mixing 50 g of 2-ethylhexyl acrylate, 100 g of methyl methacrylate, 200 g of acrylonitrile, 50 g of acrylic acid and 20 g of the above emulsifier in 170 g of deionized water. The mixture ($b_7$) was subjected to polymerization reaction and the reaction mixture was aged in the same manner as in Example 7.

After the aging, the content of the flask was cooled to 40° C., and an aqueous solution of potassium hydroxide was added thereto for neutralization. On completion of the reaction, the mixture was vigorously agitated to give an aqueous emulsion of water-dispersible copolymer [II] having an emulsifier content of 5.5 wt. %. The obtained aqueous copolymer [II] had a glass transition temperature of 69° C.

To 100 parts by weight (calculated as solids) of the emulsion of water-dispersible copolymer [I] was added 40 parts by weight (calculated as solids) of the emulsion of water-dispersible copolymer [II], giving a coating composition for forming an undercoat layer and having a solids concentration of 40 wt. % (viscosity: 500 cps).

On a paper making machine, the obtained coating composition was applied to wood-free paper weighing 50 g/m² and having a thickness of 65 μm by means of a blade coater in an amount of 4 g/m² on dry basis. The coated paper was dried to give a release sheet base paper having an undercoat layer formed thereon, which as a whole had a bulk density of 0.85 g/cm³.

The silicone release agent as used in Example 2 was applied to the undercoat layer and dried in the same manner as in Example 2 to give a release sheet. The release sheet base paper having the undercoat layer thereon had an excellent resistance to the coating composition of the release agent, and the obtained release sheet had uniform and adequate releasability. Then, an adhesive sheet was prepared in the same manner as in Example 2 using the release sheet. The obtained adhesive sheet involved no occurrence of curls and was outstanding in ability to pass through a copier and in suitability for copying by a copier.

EXAMPLE 9

An emulsion of water-dispersible copolymer [I] having an emulsifier content of 3.0 wt. % was prepared by emulsion copolymerization and neutralization with sodium hydroxide in the same manner as in Example 7 with the exception of using a monomer mixture containing 300 g of butyl acrylate, 80 g of acrylic acid, 12 g of acrylonitrile and 8 g of acrylamide. The obtained water-dispersible copolymer [I] had a glass transition temperature of $-41°$ C.

To 100 parts by weight (calculated as solids) of the emulsion of water-dispersible copolymer [I] were added 50 parts by weight (calculated as solids) of the emulsion of water-dispersible copolymer [II] prepared in Example 8, five parts by weight of polyethylene glycol and 5 parts by weight of an epoxy compound (tradename: Denacol EX-851, product of Nagase Kasei Kogyo Kabushiki Kaisha), giving a coating composition for forming an undercoat layer and having a solids concentration of 35 wt. % (viscosity: 350 cps).

The coating composition obtained above was applied to wood-free paper weighing 64 g/m² and having a thickness of 70 μm by means of a blade coater in an amount of 7 g/m² on dry basis. The coated paper was dried to give a release sheet base paper having an undercoat layer formed thereon, which as a whole had a bulk density of 0.88 g/cm³.

A silicone release agent as used in Example 3 was applied to the undercoat layer and dried in the same manner as in Example 3 to give a release sheet of the invention. The release sheet base paper having the undercoat layer thereon had an excellent resistance to the coating composition of the release agent, and the obtained release sheet had uniform and adequate releasability. Then, an adhesive sheet was prepared in the same manner as in Example 3 using the release sheet. The obtained adhesive sheet involved no occurrence of curls and was outstanding in ability to pass through a copier and in suitability for copying by the copier.

EXAMPLE 10

An aqueous emulsion of water-dispersible copolymer mixture was prepared by mixing 100 parts by weight (calculated as solids) of an aqueous emulsion of butyl acrylate-acrylonitrile-acrylic acid terpolymer (Tg: −14° C., tradename: Rikabond ET-L-924-1, product of Chuo Rika Kogyo Kabushiki Kaisha) having an emulsifier content of 2 wt. % wherein the emulsifier had a molecular weight of 2,500, and 20 parts by weight (calculated as solids) of an aqueous emulsion of butyl acrylate-acrylonitrile-methyl methacrylate-acrylic acid tetrapolymer (Tg: 48° C., tradename: Rikabond ET-L-924-2, product of Chuo Rika Kogyo Kabushiki Kaisha) having an emulsifier content of 2 wt. % wherein the emulsifier had a molecular weight of 2,500. To the aqueous copolymer mixture were added 10 parts by weight of polyvinyl alcohol, 1 part by weight of glycerin, 2 parts by weight of colloidal silica and 0.1 part by weight of a defoaming agent, giving an aqueous dispersion-type coating composition for forming an undercoat layer and having a solids concentration of 40 wt. % (viscosity: 400 cps).

The obtained coating composition was applied to wood-free paper weighing 40 g/m² and having a thickness of 55 μm by means of a rod blade coater in an amount of 5 g/m² on dry basis. The coated paper was dried to give a release sheet base paper having an undercoat layer, which as a whole had a bulk density of 0.82 g/cm³.

A silicone release agent as used in Example 1 was applied to the undercoat layer and dried in the same manner as in Example 1 to give a release sheet of the invention. The obtained release sheet base paper having the undercoat layer thereon had an excellent resistance to the coating composition of the release agent, and the obtained release sheet had uniform and adequate releasability. Then, an adhesive sheet was prepared in the same manner as in Example 1 using the release paper. The obtained adhesive sheet involved no occurrence of curls and was outstanding in ability to pass through a copier and in suitability for copying by the copier.

EXAMPLE 11

To 100 parts by weight (calculated as solids) of the aqueous emulsion of water-dispersible copolymer mixture prepared in Example 10 were added 0.5 part by weight of a polyoxyethylene ether derivative-type thickener (tradename: Vissurf S, product of Kao Atlas Co., Ltd.), 8 parts by weight of polyvinyl alcohol, 1 part by weight of glycerin, 2 parts by weight of colloidal silica and 0.1 part by weight of a defoaming agent, giving an aqueous dispersion-type coating composition for forming an undercoat layer and having a solids concentration of 40 wt. % (viscosity: 800 cps).

On a paper making machine, the obtained coating composition was applied to wood-free paper weighing 40 g/m² and having a thickness of 55 μm by means of a blade coater in an amount of 5 g/m² on dry basis. The coated paper was dried to give a release sheet base paper having an undercoat layer thereon, which as a whole had a bulk density of 0.82 g/cm³.

A silicone release agent as used in Example 2 was applied to the undercoat layer and dried in the same manner as in Example 2 to give a release sheet of the invention. The release sheet base paper with the adhesive layer formed thereon had an excellent resistance to the coating composition of the release agent, and the obtained release sheet had uniform and adequate releasability. Then, an adhesive sheet was prepared in the same manner as in Example 2 using the release paper. The obtained adhesive sheet involved no occurrence of curls and was outstanding in ability to pass through a copier and in suitability for copying by the copier.

EXAMPLE 12

Aqueous emulsions of water-dispersible copolymers [I] and [II] were prepared in the same manner as in Example 7 with the exception of using an emulsifier of sodium salt of polyoxyethylene alkyl ether sulfate (tradename: Levenol WZ, product of Kao Atlas Co., Ltd, MW: 1,200). Using these aqueous emulsions of copolymers [I] and [II], an aqueous dispersion-type coating composition for forming an undercoat layer and having a solids concentration of 30 wt. % (viscosity: 100 cps) was prepared following the procedure of Example 7.

The obtained coating composition was applied to wood-free paper weighing 64 g/m² and having a thickness of 70 μm by means of a bar coater in an amount of 7 g/m² on dry basis. The coated paper was dried to give a release sheet base paper having an undercoat layer formed thereon, which as a whole had a bulk density of 0.87 g/cm³.

A silicone release agent as used in Example 3 was applied to the undercoat layer and dried in the same manner as in Example 3 to give a release sheet of the invention. The release sheet base paper having the undercoat layer formed thereon had an excellent resistance to the coating composition of the release agent, and the obtained release sheet had uniform and adequate releasability. Then, an adhesive sheet was prepared in the same manner as in Example 3 using the release paper. The obtained adhesive paper involved no occurrence of curls and was outstanding in ability to pass through a copier and in suitability for copying by the copier.

COMPARISON EXAMPLE 2

To wood-free paper weighing 50 g/m² and having a thickness of 65 μm was applied an aqueous solution of styrene-maleic acid copolymer (trade name: Scripset 520, product of Monsanto Ltd.) by means of a bar coater in an amount of 5 g on dry basis. The coated paper was dried, forming an undercoat layer.

The above aqueous solution had a solids concentration of 12 wt. % and the copolymer had a glass transition temperature of 156° C.

A coating composition of silicone release agent as used in Example 1 was applied to the above undercoat layer and dried in the same manner as in Example 1 to give a release sheet.

The release sheet base paper having the undercoat layer formed thereon had an excellent resistance to the coating composition of the release agent. However, an adhesive sheet prepared in the same manner as in Example 1 using the above release sheet involved marked occurrence of curls and was very poor in ability to pass through a copier and in suitability for copying by the copier.

We claim:

1. An adhesive sheet comprising a release sheet base material, an undercoat layer formed on said release sheet base material, a release agent layer formed on said undercoat layer, an adhesive layer formed on said release agent layer and a surface sheet formed on said adhesive layer, the adhesive sheet being characterized in that said undercoat layer comprises a mixture of a first copolymer and a second copolymer, said first and second copolymers comprising acrylate or methacrylate copolymers, said first copolymer comprising a copolymer prepared by emulsion polymerization of a first monomer mixture in the presence of a first emulsifier having a molecular weight of about 1,000 to about 10,000, said first emulsifier being used in an about of 2 to 10 wt. % based on the total amount of said first monomer mixture, said first copolymer having a glass transition of −60 to 0° C., said first monomer mixture comprising
   (a) about 1 to about 20 wt. % of a first ethylenically unsaturated carboxyl-containing monomer,
   (b) about 40 to about 90 wt. % of a first $C_4$–$C_{18}$ alkyl ester monomer of acrylic or methacrylic acid and
   (c) 0 to about 40 wt. % of at least one first other monomer copolymerizable with said ethylenically unsaturated carboxyl containing monomer and said $C_4$–$C_{18}$ alkyl ester of acrylic or methacrylic acid, said second copolymer comprising a copolymer prepared by emulsion polymerization of a second monomer mixture in the presence of a second emulsifier having a molecular weight of about 1,000 to about 10,000, said second emulsifier being used in an amount of about 2 to about 10 wt. % based on the total amount of said second monomer mixture, and said second copolymer having a glass transition temperature of 45 to 100° C., said second monomer mixture comprising
   (d) about 1 to about 20 wt. % of a second ethylenically unsaturated carboxyl-containing monomer,
   (e) about 5 to about 40 wt. % of a second $C_4$–$C_{18}$ alkyl ester monomer of acrylic or methacrylic acid, and
   (f) about 50 to about 90 wt. % of at least one second other monomer copolymerizable with said second ethylenically unsaturated carboxyl-containing monomer and said second $C_4$–$C_{18}$ alkyl ester monomer of acrylic or methacrylic acid,
said release sheet base material and said undercoat layer, as a whole, having a bulk density of up to 1.0 g/cm$^3$.

2. An adhesive sheet according to claim 1 wherein the release sheet base material having the undercoat layer formed thereon, as a whole, has a stiffness of 70 to 200 mg.

3. An adhesive sheet according to claim 1 wherein the release agent has a tensile strength (JIS K-6301) of at least about 30 kg/cm$^2$.

4. An adhesive sheet according to claim 1 wherein the surface sheet is surface-treated with a coating composition containing a polymer having a glass transition temperature of −40 to 100° C. and dried.

5. An adhesive sheet according to claim 1 wherein said undercoat layer contains 5 to 80 parts by weight of said acrylate or methacrylate second copolymer per 100 parts by weight of said acrylate or methacrylate first copolymer.

6. An adhesive sheet according to claim 1 wherein said emulsifier comprises a surfactant having both nonionic and anionic characteristics.

7. An adhesive sheet according to claim 1 wherein said undercoat layer contains about 0.01 to about 5 parts by weight of a polyoxyethylene ether derivative thickener per 100 parts by weight of the total amount of said acrylate or methacrylate first and second copolymers.

8. A method for preparing a release sheet comprising the steps of forming an undercoat layer by applying to one or both sides of a release sheet base material a coating composition comprising an acrylate or methacrylate copolymer resin, said resin having an emulsifier content of 2 to 10 wt. % based on the total amount of the monomers used to prepare said copolymer resin and forming a release agent layer on said undercoat layer, said acrylate or methacrylate copolymer resin comprising a mixture of a first copolymer and a second copolymer, said first and second copolymers comprising acrylate or methacrylate copolymers, said first copolymer comprising a copolymer prepared by emulsion polymerization of a first monomer mixture in the presence of a first emulsifier having a molecular weight of about 1,000 to about 10,000, said first emulsifier being used in an amount of 2 to 10 wt. % based on the total amount of said first monomer mixture, said copolymer having a glass transition temperature of −60 to 0° C., said first monomer mixture comprising
   (a) about 1 to about 20 wt. % of a first ethylenically unsaturated carboxyl-containing monomer,
   (b) about 40 to about 90 wt. % of a first $C_4$–$C_{18}$ alkyl ester monomer of acrylic or methacrylic acid and
   (c) 0 to about 40 wt. % of at least one first other monomer copolymerizable with said ethylenically unsaturated carboxyl containing monomer and said $C_4$–$C_{18}$ alkyl ester of acrylic or methacrylic acid,
said second copolymer comprising a copolymer prepared by emulsion polymerization of a second monomer mixture in the presence of a second emulsifier having a molecular weight of about 1,000 to about 10,000, said second emulsifier being used in an amount of about 2 to about 10 wt. % based on the total amount of said second monomer mixture, and said second copolymer having a glass transition temperature of 45 to 100° C., said second monomer mixture comprising
   (d) about 1 to about 20 wt. % of a second ethylenically unsaturated carboxyl-containing monomer, (e) about 5 to about 40 wt. % of a second $C_4$-$C_{18}$ alkyl ester monomer of acrylic or methacrylic acid, and (f) about 50 to about 90 wt. % of at least one second other monomer copolymerizable with said second ethylenically unsaturated carboxyl-containing monomer and said second $C_4$-$C_{18}$ alkyl ester monomer of acrylic or methacrylic acid.

9. A method according to claim 8 wherein said undercoat layer contains 5 to 80 parts by weight of said acrylate or methacrylate second copolymer per 100 parts by weight of said acrylate or methacrylate first copolymer.

10. A method according to claim 8 wherein said emulsifier comprises a surfactant having both nonionic and anionic characteristics.

11. A method according to claim 8 wherein said undercoat layer is formed on one or both sides of said release sheet base material by a blade coater.

12. A method according to claim 8 wherein said undercoat layer is formed on one side of a release sheet base material by a on-machine blade coater.

* * * * *